US008428598B2

(12) United States Patent
Lee

(10) Patent No.: US 8,428,598 B2
(45) Date of Patent: *Apr. 23, 2013

(54) PROACTIVE HANDOVER POLICY

(75) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,875

(22) Filed: Nov. 10, 2011

(65) Prior Publication Data
US 2012/0058770 A1     Mar. 8, 2012

Related U.S. Application Data

(63) Continuation of application No. 12/345,806, filed on Dec. 30, 2008, now Pat. No. 8,064,910.

(51) Int. Cl.
*H04W 36/00* (2009.01)
(52) U.S. Cl.
USPC ........... 455/436; 455/438; 455/439; 370/331; 370/332
(58) Field of Classification Search ............... 455/422.1, 455/436–444; 370/331–333
See application file for complete search history.

(56) References Cited

U.S. PATENT DOCUMENTS

| 2002/0177447 | A1 | 11/2002 | Walton et al. |
| 2004/0166864 | A1 | 8/2004 | Hill et al. |
| 2008/0076430 | A1* | 3/2008 | Olson ........................... 455/440 |
| 2009/0197604 | A1* | 8/2009 | Gupta et al. .................. 455/436 |
| 2010/0056157 | A1* | 3/2010 | Verona et al. ................. 455/438 |
| 2011/0026487 | A1* | 2/2011 | Karaoguz et al. ............. 370/331 |
| 2011/0038350 | A1* | 2/2011 | Gholmieh et al. ............ 370/331 |
| 2011/0065438 | A1* | 3/2011 | Bergman et al. .............. 455/436 |

FOREIGN PATENT DOCUMENTS

WO    WO-2005/071998    8/2005

* cited by examiner

Primary Examiner — Ajit Patel

(57) ABSTRACT

An exemplary system and method for determining handovers for a mobile device are disclosed. An exemplary system may generally include a handover server in communication with a communication network configured to support initiated communications from a mobile device. The handover server is configured to detect an initiated communication between the mobile device and a first communication link, determine a value for each of a plurality of factors associated with each of a plurality of available communication links, and assign a desired communication link to the mobile device from the plurality of available communication using a generally simultaneous assessment of the plurality of factors.

21 Claims, 4 Drawing Sheets

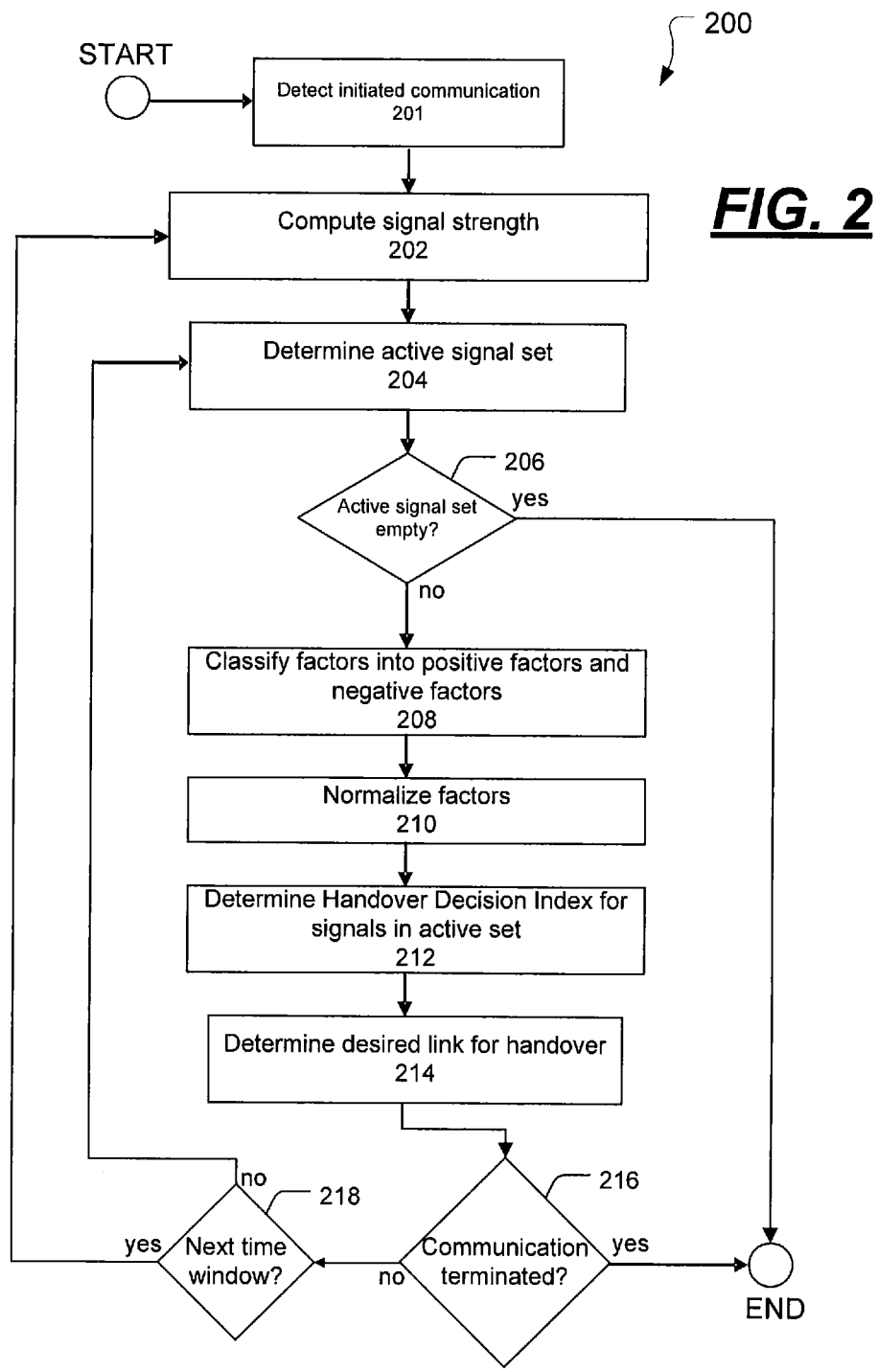

PROACTIVE HANDOVER POLICY

CROSS REFERENCE TO RELATED APPLICATIONS

This application is a continuation of U.S. patent application Ser. No. 12/345,806, filed on Dec. 30, 2008, which is hereby incorporated by reference in its entirety.

BACKGROUND

Mobile communication devices rely on handovers to ensure continuous service during a communication initiated by the device, e.g., a phone call, such as when the mobile device is moving in a car, train, while walking, etc. Generally, mobile devices will transmit a communication signal through an initial communication link, e.g., a communication tower, until it is determined that the signal strength between the device and the tower is relatively weak in comparison to other available communication links, such as when the mobile device is moving further away from the tower over time. The device or the tower may then initiate a handover of the communication signal to another communication link, e.g., a communication tower that is closer to the mobile device, or can provide a stronger signal strength to the device. The handover generally automatically transfers the connection of the mobile device from one location to another, while maintaining continuous connectivity of the mobile device. Known handover methodologies thus rely generally exclusively on signal strength to determine when and where to initiate a handover.

Employing signal strength as the sole factor to determine when and where to initiate a handover may force a handover when it is not optimal for a given mobile device. For example, if a communication between a mobile device and an initial tower is becoming weaker, and two other available towers are identified, a handover will generally be initiated to the tower having the strongest signal. However, if the difference in signal strength between the available towers is not significant, but other characteristics of the towers are much different such as a cost of using each respective tower, type of technology employed by the tower, etc., then the tower with the strongest signal may nonetheless have significant disadvantages in view of these other characteristics. As a result, a handover may be forced to a tower that is more expensive for the particular mobile device, does not provide an ideal connection type, or otherwise suffers from some disadvantage relative to other available towers despite any advantage in signal strength. This has become especially problematic in view of the recent proliferation of available technologies for supporting mobile communication, each of which may have different capabilities and costs for a given mobile device and service provider.

Accordingly, there is a need for an improved handover process that contemplates characteristics of available communication links other than the signal strength associated with the communication links.

BRIEF DESCRIPTION OF THE DRAWINGS

FIG. 2 illustrates an exemplary process for creating, storing, and retrieving records associated with initiated communications.

DETAILED DESCRIPTION

Various examples of systems and methods for determining handovers for a mobile device are disclosed. An exemplary method may include detecting an initiated communication between a mobile device and a first communication link, determining a value for each of a plurality of factors associated with each of a plurality of available communication links, and assigning a desired communication link from the plurality of available communication links based upon a generally simultaneous assessment of the plurality of factors.

An exemplary system may generally include a handover server in communication with a communication network configured to support initiated communications from a mobile device. The handover server is configured to detect an initiated communication between the mobile device and a first communication link, determine a value for each of a plurality of factors associated with each of a plurality of available communication links, and assign a desired communication link to the mobile device from the plurality of available communication using a generally simultaneous assessment of the plurality of factors.

In some examples, an appropriate handover for a mobile device may be determined using a plurality of factors generally simultaneously or in a parallel fashion. Accordingly, the exemplary systems and methods may offer enhanced flexibility in emphasizing various factors without entirely diminishing an effect of factors having a lesser priority over others. For example, where a system evaluates metrics or factors in a series fashion based on a desired priority of the available metrics, i.e., by looking first to a highest priority factor and then considering a lower priority factor only if the higher priority factor is not determinative, the lower priority factors will rarely, if ever, factor into a handover determination. In general, lower priority factors may have very little influence in these situations because they may only be employed when all higher priority factors are not determinative, which may be very rare. Alternatively, the exemplary methods and systems described herein may determine a handover with a generally simultaneous determination that employs a variety of factors.

Figure 1A:
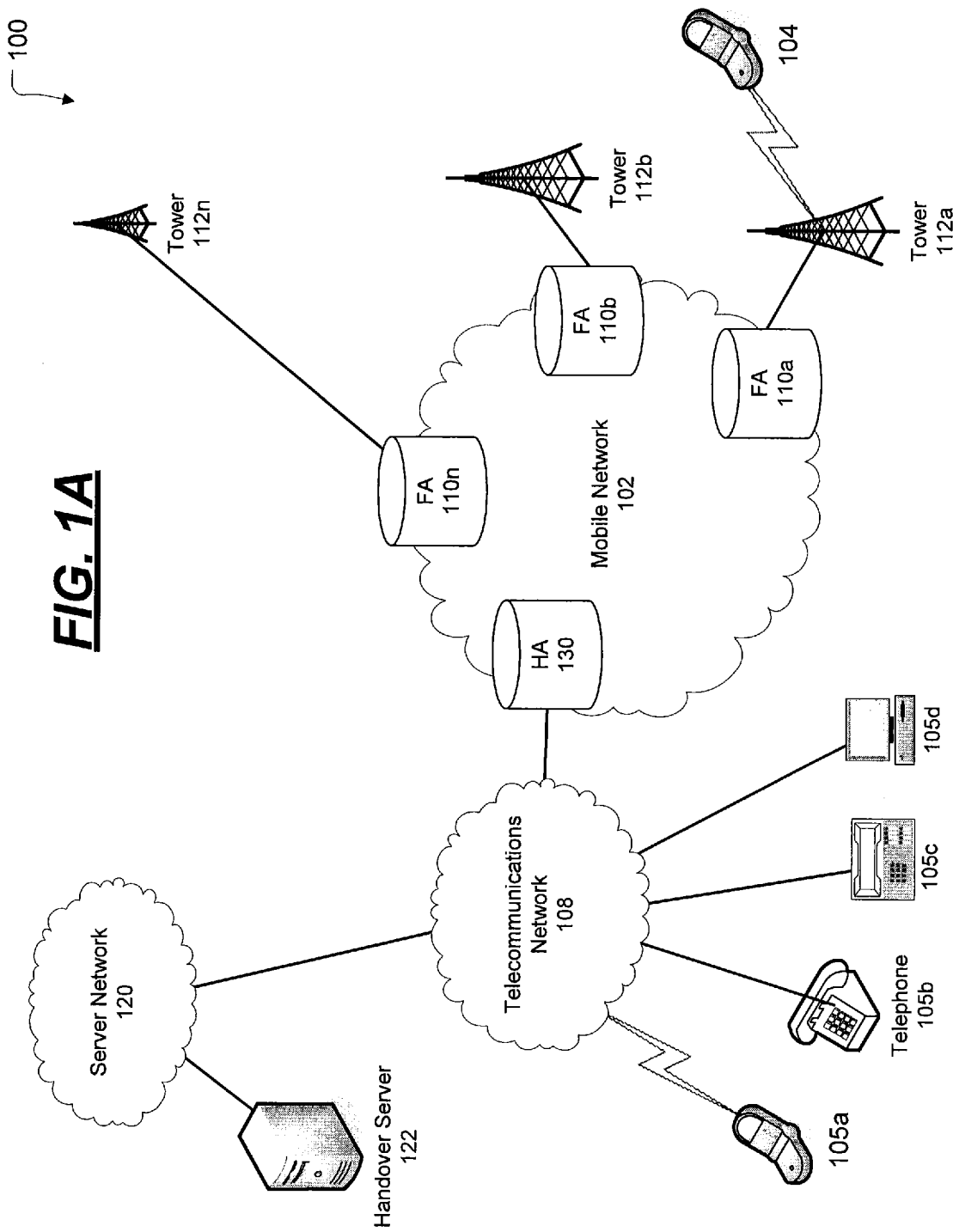
FIG. 1A illustrates an exemplary architecture of a communication system including a handover server.
Figure 1B:
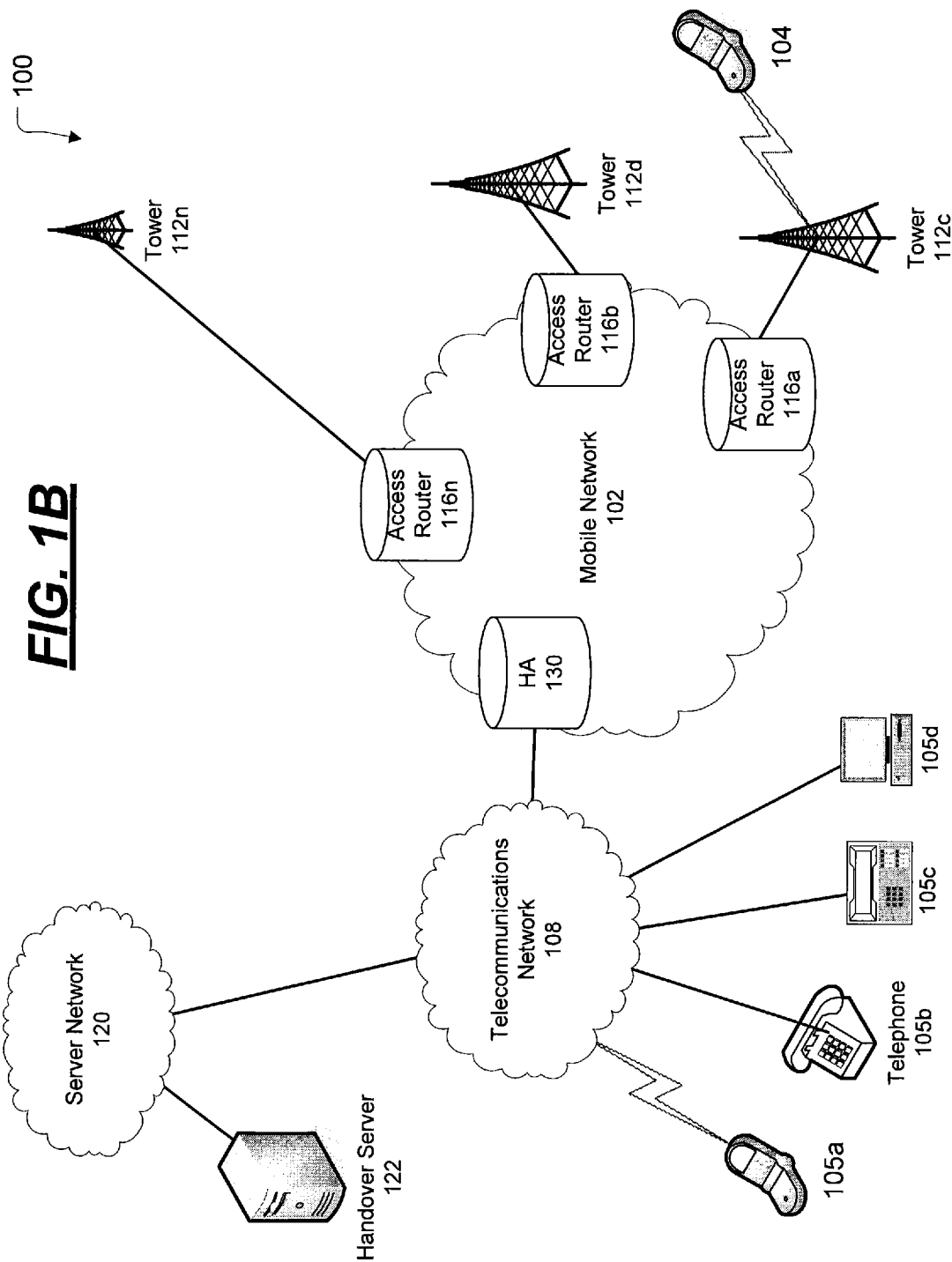
FIG. 1B illustrates an exemplary architecture of another portion of the exemplary communication system shown in FIG. 1A.
Figure 1C:
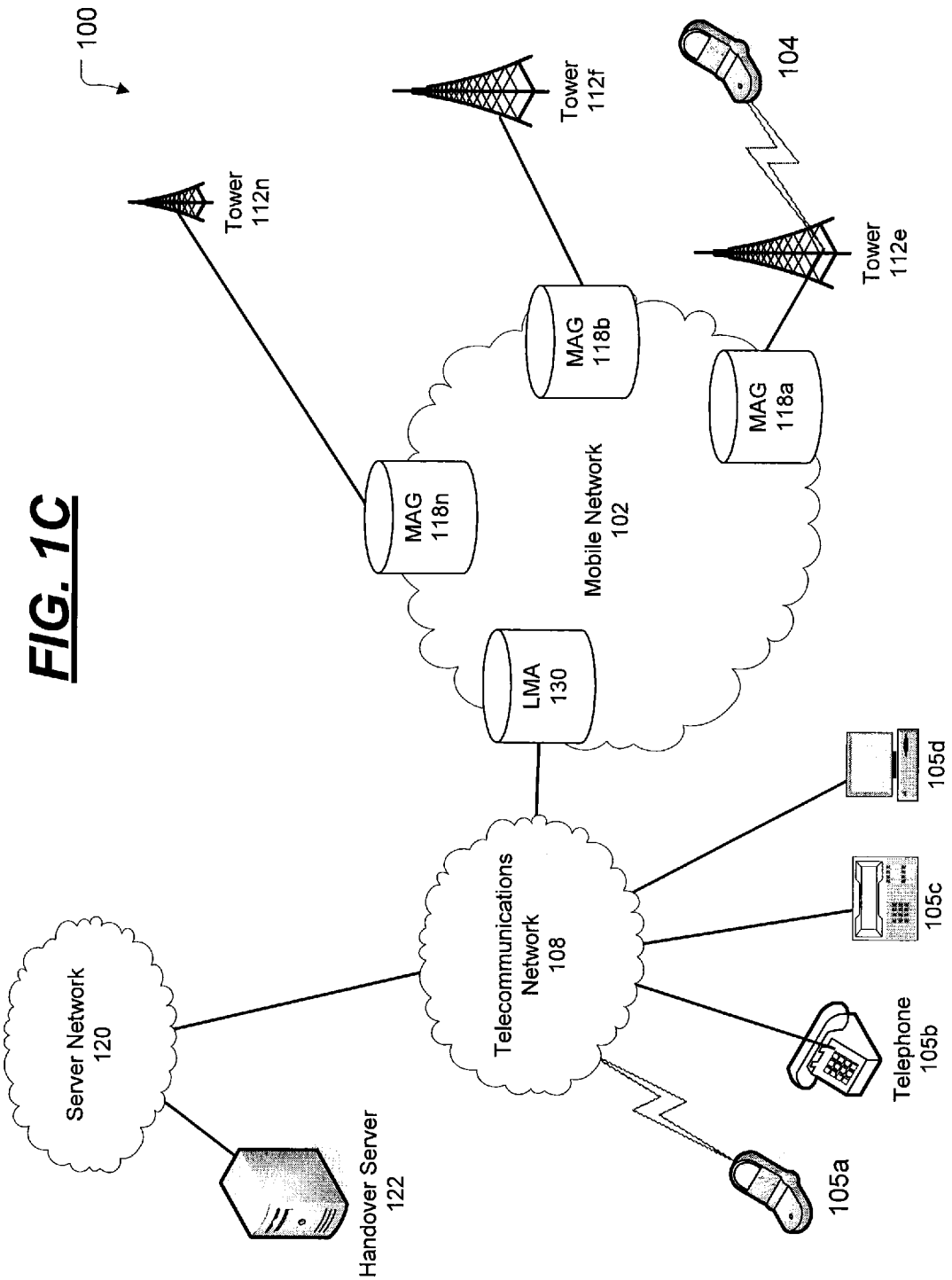
FIG. 1C illustrates an exemplary architecture of another portion of the exemplary communication system shown in FIGS. 1A and 1B.

Turning now to FIGS. 1A-1C, each of the figures illustrates a portion of a general architecture and operation of an exemplary telecommunications system 100. System 100 generally includes a mobile device 104 in communication with a telecommunications network 108 via a mobile network 102, such as an internet protocol (IP) packet core network configured to transmit and switch packets sent across the network 102. Three distinct examples of a mobile network 102a, 102b, and 102c are illustrated in FIGS. 1A, 1B, and 1C, respectively, and each will be described in further detail regarding general IP protocols for each. A user may initiate communications, such as by way of a phone call or data connection, to any of a variety of other telecommunications devices 105 through the telecommunications network 108, e.g., another mobile device 105a, a land-line telephone 105b, Private Branch Exchange (PBX) telephone 105c, computer device 105d, or any other known communication devices. The telecommunications network may be an IP core network, or Public Switched Telephone Network (PSTN), as examples. The handover server 122 generally determines handovers associated with the mobile device 104, as will be described further below.

Mobile device 104 may be a wireless telephone, although other kinds of telecommunications devices may be included in various approaches. For example, wireless device 104 could include a variety of devices used to place and receive calls and transmit or receive other data communications such as personal computers, laptop computers, handheld computers, personal digital assistants, wireless e-mail devices, or devices that include some combination of a computer and a telephone. The mobile device 104 may generally communicate through telecommunications network 108 using Signaling System #7 (SS7) signaling, as an example, or Session Initiation Protocol (SIP), as another example. Further, other telecommunications devices which are well known may be implemented in system 100. For example, a Voice over Internet Protocol (VoIP) device may be implemented in system 100, and may communicate with various telecommunications devices over system 100 as is generally known.

Although a single mobile device 104 is shown, there may be a large number of mobile devices 104 in communication with or through system 100 at any given time. The mobile device 104 and/or handoff server 122 may initiate handoffs between a great number of communication links, e.g., cellular base stations, radio network controllers (RNCs), WiFi access points (APS), WiMax base stations, etc. These communication links are generically shown as towers 112a, 112b, 112c, 112d, 112e, 112f ... 112n (collectively, 112) in FIGS. 1A, 1B and 1C. The plurality of towers 112 allow mobile device 104 to communicate with system 100, and it is to be understood that system 100 likely will include hundreds if not thousands of other communication links such as towers 112. FIGS. 1A, 1B, and 1C should not be interpreted to suggest that there is necessarily any geographic limitation to system 100. In fact, system 100 may facilitate communications between different cites, states, and even countries.

Communications through system 100 may be initiated, for example, when a call is placed by a user of mobile device 104 to another device, e.g., any of the devices 105, as is generally well known. Mobile device 104 generally communicates with a communication link within range of device 104, such as local tower 112. Tower 112 may transmit communication signals from device 104 to the mobile network 102. Each mobile network 102 is associated with one or more towers 112, and each generally simultaneously or nearly simultaneously handles communications for a plurality of wireless devices 104, including at least monitoring all communications, e.g., calls, and tracking the location of each device 104. The mobile networks may each include devices assigned to one or more towers 112 for facilitating communication by mobile device 104, e.g., foreign agents 110, access routers 116, and/or Mobile Access Gateways (MAGs) 118. A home agent 130 of each mobile device, e.g., a Mobile Telephone Switching Office (MTSO), is in communication with each of the foreign agents 110, access routers 116, and MAGs 118.

Handoffs for the mobile device 104 during an initiated communication may be determined by the mobile device 104, the handoff server 122, or any other component of the mobile networks 102 that is convenient. While the system 100 and process 200 are generally described below as relying on handoffs determined and initiated by the handoff server 122, the mobile device 104 itself or other components of the mobile networks 102 may instead provide for handoffs of the mobile device 104 unless expressly indicated otherwise.

A server network 120 may link the handoff server 122 to telecommunications network 108, and ultimately to the mobile device 104, and may generally detect communications such as phone calls initiated by mobile device 104. Server network 120 may subsequently notify handoff server 122 of the initiated call. Handoff server 122 may then determine handoffs between the various towers 112 as further described below.

The handoff server 122, mobile device 104, and other components of the mobile network 102 utilized for determining and initiating handoffs of mobile device 104 may include any one of a number of known computing devices, including, without limitation, a computer workstation, a desktop, notebook, laptop, or handheld computer, or some other computing device known to those skilled in the art. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various embodiments such as handoff server 122 and/or mobile device 104 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Handoff server 122 may include a logic or a heuristic for determining handoffs for the mobile device 104 between towers 112, and may additionally be configured to initiate the handoffs when determined by the handoff server 122. Generally, the mobile device 104 may roam seamlessly across different access technologies present in system 100 and various mobile networks 102, requiring handovers among WiFi (802.11), WiMax, femtocell, Code Division Multiple Access (CDMA), and Global System for Mobile Communications (GSM) networks, merely as examples. A given mobile network 102 generally has its own technologies and requirements, such as link types, link bandwidth, link quality, security requirements, Quality of Service (QoS) requirements, roaming partners, and so on. Therefore, the handover server 122 is configured to evaluate these variables from available interfaces, e.g., towers 112 or other linking devices, to find the best communication link, e.g., a tower 112, to which the handover may be directed. The handover server 122 employs a generally proactive handover method, as further described below in regard to process 200, thereby allowing the mobile device 104 to roam seamlessly with internet protocol (IP) session continuity across any heterogeneous access networks, i.e., any access networks that the mobile device 104 is capable of communicating across.

The IP mobility of mobile device 104 may be determined using Client Mobile Internet Protocol (CMIP), or Proxy Mobile Internet Protocol (PMIP), as examples. In CMIP, the mobile network 102 or the client may generally control mobility management, while, in PMIP, the network generally controls mobility management.

Device information exchanges may performed by the mobile networks 102 and a radio access network (RAN), e.g., the towers 112, as part of a "Layer 2 (L2)" handover. Examples of device information typical of a Layer 2 handover include bandwidth (or a speed associated with the link), signal strength (SNR), link cost (e.g., a cost for a given user to utilize a link type), network cost (e.g., network types), roaming cost (e.g., cost according to a given roaming partner associated with a roaming network), security cost (security requirements), Quality of Service (QoS) requirements, latency, and others. Additionally, CMIP or PMIP may be employed for handovers and exchanges of network information, e.g., in a "Layer 3 (L3)" handover. Network information exchanged as part of a Layer 3 handover may include, as examples, solicitation messages, a home network prefix, care of address information, etc. Therefore, the exemplary method described below may employ both Layer 2 and Layer 3 handovers for a mobile network utilizing both CMIP and PMIP, as examples.

FIGS. 1A, 1B, and 1C illustrate the system 100 using a proactive handover employing L2 information and L3 information for three currently available IP mobility protocols defined by the Internet Engineering Task Force (IETF), namely, CMIP version 4 (CMIPv4), CMIP version 6 (CMIPv6), and PMIP version 6 (PMIPv6), respectively. The handover server 122 and/or mobile device 104 may rely upon any L2 information or metrics for determining handovers. The information or metrics employed for determining handovers may be varied to suit preferences of a particular vendors or service provider. For each example, the handover server 122 and/or mobile device 104 may determine handovers for the mobile device 104.

Referring now to FIG. 1A, an overview of system 100 using a CMIPv4 protocol and employing L2 and L3 information handovers is illustrated. Mobile device 104 is initially linked with tower 112a and foreign agent 110a. The handover server 122 receives information from a plurality of neighboring towers within a given proximity of the mobile device 104. As shown in FIG. 1A, the handover server 122 receives link status information from towers 112a and 112b, but may additionally receive link state information from a great number of other towers 112 not specifically shown in FIG. 1A. The handover server 122 evaluates this L2 information using a proactive handover method, such as further described below, and decides to initiate a handover to a new tower 112b. With this handover decision made, the handover server 122 sends solicitation messages to the foreign agent 110b associated with the desired tower 112b, and requests a response. Upon receiving the solicitation from the handover server 122, foreign agent 110b may send a confirming message with a home network prefix and care of address (CoA) information for the mobile device 104. As soon as the handover server 122 receives the confirmation from the new foreign agent 110b, the mobile device 104 can register with its associated home agent 130.

Turning now to FIG. 1B, a proactive MIP handover for a CMIPv6 protocol is shown. Mobile device 104 is initially linked with tower 112c and access router 116a. The handover server 122 generally receives link state information from available towers or other communication links, e.g., towers 112c and 112d as shown. Handover server 122 may in reality receive information from a great number of other towers not shown along with towers 112d, 112n. The handover server 122 evaluates link state information associated with the towers 112c, 112d . . . 112n, for example as further described below, and decides to initiate a handover to a new link, e.g., tower 112d. After the mobile device 104 is attached to the new tower 112d, the mobile device 104 may acquire a new Internet Protocol version 6 (IPv6) address in the visited network, typically using an auto-configuration protocol. The mobile device 104 may obtain its home address and home agent 130 address statically or dynamically, and registers with its home agent 130. Note that, in the CMIPv6 example in FIG. 1B, there is no foreign agent, e.g., foreign agents 110a, 110b needed for IP mobility of the mobile device 104.

Turning now to FIG. 1C, a proactive MIP handover is shown for the PMIPv6 protocol. A mobile device 104 initially communicates over the telecommunications network via a tower 112e, and an associated Mobile Access Gateway (MAG) 118a. The handover server 122 receives link state information from one or more neighboring link devices, e.g., towers 112f, 112n, evaluates this information, such as by using the exemplary method described below, and decides to initiate a handover to a new tower 112f. When the mobile device 104 attaches to a new access network, the new tower 112f will identify the mobile device 104 and, after authentication of the mobile device 104, will notify an associated MAG 118b. The mobile device 104 may send solicitation messages to the tower 112f as part of the handover process. Upon hearing solicitation from the mobile device 104, the MAG 118b may send a Proxy Binding Update (PBU) message to a Local Mobility Anchor (LMA) 132 associated with the mobile device 104. Upon receiving PBU messages, the LMA 132 may send a Proxy Binding Acknowledgement (PBA) with a home network prefix of the mobile device 104 to the new MAG 118b. The MAG 118b now has enough information to emulate a home link of the mobile device 104, and sends a router advertisement to the mobile device 104. Upon receiving the router advertisement, the mobile device 104 may configure an interface with the new MAG 118b.

Proceeding now to FIG. 2, a process 200 for determining handovers associated with a mobile device 104 and proactively identifying a desired communication link for the mobile device 104, is described. Process 200 may begin at step 201, where an initiated communication, e.g., a phone call, is detected between a mobile device 104 and another device through a telecommunications network 108. For example, the handover server 122 may detect a phone call received or initiated by the mobile device 104.

Proceeding to step 202, an average signal strength is determined for a current communication link associated with the mobile device 104, e.g., tower 112a as described above. In one known example, a weighted moving average signal strength may be determined.

More specifically, the handover server 122 and/or mobile device 104 may scan for a signal strength of towers 112 within a given proximity or range of mobile device 104 every T seconds. An active set of links may be defined that includes only links with a signal strength that is greater than a historical average value, e.g., that which is currently being employed by the mobile device 104. This average or mean value can be determined by a weighted moving average of the average values of Signal-to-noise Ratios (SNRs) determined from previous time windows. The handover server may then evaluate links that belong to this active set for the handover decision, thus reducing computing time and complexity of the algorithm or heuristic.

Thus, for each ith time window, the handover server 122 generally computes the weighted moving average of SNRs from an available number of links m. If $s^i$ is the average signal strength of all the links in the ith window, the weighted moving average of signal strength at the time of ith window is:

$$\overline{s^i} = w \cdot s^i + (1-w) \cdot \overline{s^{i-1}} \qquad (1)$$

In the equation (1) above, w may be a weighting factor between zero and one that emphasizes a strength of signal value for a current time window when it is closer to one, and a strength of signal value for the preceding time window when it is closer or equal to zero.

Proceeding to step 204, an active signal set is determined that contains signals exceeding the average signal strength determined in step 202. In other words, the handover server 122 may generally determine what, if any, towers 112 are present that have a signal strength that exceeds that of the current tower 112. Based on the average calculated in step 202, the handover server 122 generally scans signal strengths of all available links, and defines an active set of links having a signal strength greater than the weighted moving average, $\overline{s^i}$. If $Q_i$ is an active signal set of links for the ith window whose signal strength is higher than the average $\overline{s^i}$, then $$Q^i = \{q_j^i | q_j^i > \overline{s^i}, 1 \leq j \leq m\} \qquad (2)$$

In other words, an active set of links $Q_i$ may include all links q included in the number of links m that have a signal strength that is greater than the average signal strength $s^i$. To find the best link for the handover, the handover server 122 may thus consider only the signals in the active set $Q_i$, which is a subset of all the available links m. Process 200 may then proceed to step 206.

In step 206, the handover server 122 queries whether the signal set determined in step 204 is empty. In other words, if no tower 112 or other linking device is found having an average signal strength that exceeds that of the current tower 112 or linking device, then no other tower or link device is available that offers a greater signal strength, and a handover may not be desirable at that particular time. Process 200 may thus repeat step 204 in a loop until a tower 112 or other linking device is found having a greater signal strength, or the communication to/from the mobile device 104 terminates. If the signal set is not empty, i.e., if at least one tower 112 is found having a signal strength greater than the current tower 112, then process 200 may proceed to step 208.

In step 208, the handover server 122 may determine a plurality of factors associated with each communication link in the active set, e.g. towers 112. The handover server 122 may evaluate a series of metrics to decide which link in the active set is the most appropriate one for a handover. The metrics may include any parameters affecting cost, quality, etc. of a communication link, e.g., link signal strength (e.g., SNR), link types (and associated cost for a given mobile device 104), link bandwidth, network types (and associated cost for the mobile device 104), roaming partners (and associated roaming cost for mobile device 104), security requirements and/or cost, QoS requirements, latency, or any other parameter or combination of parameters that is convenient.

Generally, some metrics may be viewed as "positive" or "profit" factors for the decision making, such as link bandwidth, SNR, QoS, in the sense that the higher the value for the particular factor, the more likely a handover is initiated. Other metrics are "negative" or "cost" factors such as link cost, roaming cost and latency, in the sense that the higher the value of the particular parameter, the less likely it is that a handover is initiated to the associated link device. Therefore, the desired factors may be divided into two categories: positive (profit) factors, as $p_{kl}^i$, and negative (cost) factors, as $c_{kl}^i$, for each link k in the active signal set for the ith time window, where the index l denotes types of metrics.

Proceeding to step 210, the handover server 122 may normalize the one or more factors that are selected for determining a handover. For example, each factor may generally be scaled between a minimum value and a maximum value associated with a particular factor. Since values of individual factors may vary widely, both positive and negative factors may be normalized to allow comparison of the factors to each other. The normalization may be carried out in any manner convenient. For example, a maximum value for each metric may be used to scale each metric, thereby minimizing variation among metrics and allowing easier comparison. Further, a weighted moving average method may be employed to smooth out any unusual fluctuations in the relative values. Let $mp_l^i$ and $mc_l^i$ be the maximum values for the positive and negative factors, respectively:

$$mp_l^i = \max_k \{p_{kl}^i\}, \text{ for all links } l \qquad (3)$$

$$mc_l^i = \max_k \{c_{kl}^i\}, \text{ for all links } l \qquad (4)$$

If $nfp_l^i$ and $nfc_l^i$ are the normalizing factors for positive and negative factors for each link l for the ith time window, and v is a weight factor for the weighted moving average, the normalizing factors can be determined by a weighted moving average method as follows, where v is a weighting factor that emphasizes a current or previous time window as convenient:

$$nfp_l^i = v \cdot mp_l^i + (1-v) \cdot nfp_l^{i-1} \qquad (5)$$

$$nfc_l^i = v \cdot mc_l^i + (1-v) \cdot nfc_l^{i-1} \qquad (6)$$

Accordingly, step 210 may generally weight each factor as a percentage of its value relative to maximum and minimum values associated with the factor, and also according to a time history of the factor.

It should be noted that any other methods of normalizing the factors may be employed that are convenient. Further, it may be desirable to omit a normalization step entirely to promote overall speed of the algorithm and/or calculation by the handover server 122, such as where the factors are already numerically comparable to each other.

Additionally, factors may be scaled relative to one another to reflect a relative importance of the factors, as will be described further below in a numerical example. The plurality of factors or metrics may thus be scaled to reflect a relative importance of the factors, e.g., signal strength being more important to a handover decision than available bandwidth or link cost, etc. Process 200 may then proceed to step 212.

In step 212, the handover server 122 may compute a Handover Decision Index (HDI) for each of the signals in the active signal set. In other words, for each available tower 112, the handover server 122 may computes the HDI to determine which of the available towers 112 will be selected for the handover.

In one exemplary illustration, to accommodate both types of factors, profit and cost functions may be separately defined for the positive and negative factors associated with each link device in the active set. The profit function for the kth link in the ith window, $PF_k^i$, as the weighted sum of positive normalized metrics, where weights, $\phi_l^i$, are given according to the level of importance, may be defined as:

$$PF_k^i = \sum_l \phi_l^i \cdot \frac{p_{kl}^i}{nfp_l^i} \text{ and } \sum_l \phi_l^i = 1; \quad (7)$$

where $nfp_l^i$ is the normalizing factor discussed above for the given profit factor associated with a link l. In the same manner, a cost function may be defined as the weighted sum of normalized negative metrics with the weights, $\theta_l^i$, given according the level of importance, i.e.:

$$CF_k^i = \sum_l \theta_l^i \cdot \frac{c_{kl}^i}{nfc_l^i} \text{ and } \sum_l \theta_l^i = 1 \quad (8)$$

where $nfc_l^i$ is the normalizing factor discussed above for the given cost factor.

The Handover Decision Index (HDI) may be defined as a numerical comparison of the profit and cost functions, e.g., a sum, ratio, or other mathematical comparison of the two separate functions. Where the HDI is defined as a ratio of the profit functions over the cost function for all k for the ith window in the active signal set, the HDI may be represented as:

$$HDI_k^i = \frac{PF_k^i}{CF_k^i} = \sum_l \phi_l^i \cdot \frac{p_{kl}^i}{nfp_l^i} \Big/ \sum_l \theta_l^i \cdot \frac{c_{kl}^i}{nfc_l^i} \quad (9)$$

In other words, the HDI may represent a summation of all normalized profit factors, divided by all normalized cost factors. Process 200 may then proceed to step 214.

In step 214, the handover server 122 selects the link signal with the highest HDI for initiating a handover. Process 200 may thus use these HDI values to pick the best link from the active signal set for the handover, e.g., the link having the highest ratio of profit factors to cost factors, the highest sum of profit factors versus cost factors, etc. Thus, the handover server 122 may select the highest value of $HDI_k^i$ for all k, as the target link for the handover. Process 200 may then proceed to step 216.

In step 216, the handover server 122 may query whether the communication initiated by the mobile device 104 has ceased, e.g., a user of mobile device 104 has terminated the communication by hanging up. If the communication has been terminated, then the process 200 may itself terminate. Alternatively, if the call or other initiated communication of mobile device 104 persists, then process 200 may proceed to step 218.

In step 218, the handover server 122 queries whether the next time window T has been reached. If the next time window has been reached, then the handover server 122 proceeds to step 202, where the average signal strength associated with the current tower 112 is determined. If, however, the next time window has not been reached then process 200 may proceed directly to step 204 and it may determine again an active signal set containing signals exceeding the average signal strength. The process 200 may therefore be tunable, for example to allow for calculation of a weighted moving average of the signal strength only once during a defined time window T.

To illustrate the exemplary process 200, a numerical example will now be described. In Table 1 below, five signals associated with towers 112 or other linking devices that exceed a desired signal strength threshold are identified, with four factors available for each signal: link bandwidth, link quality (e.g., SNR), link cost, and latency. Bandwidth and SNR are defined here as positive (or profit) factors, while link cost and latency are defined in this example as negative (cost) factors. The values of metrics in Table 1 are already normalized by their weighted moving average maximum values for fair comparison, and thus are presented as percentages.

TABLE 1

Links with metrics information

| Link ID | Bandwidth | SNR | Link Cost | Latency |
|---------|-----------|------|-----------|---------|
| 1 | 0.4 | 0.85 | 0.21 | 0.70 |
| 2 | 0.54 | 0.75 | 0.35 | 0.85 |
| 3 | 0.98 | 0.65 | 0.49 | 0.55 |
| 4 | 0.8 | 0.78 | 0.99 | 0.59 |
| 5 | 1.10 | 0.54 | 0.98 | 0.99 |

The exemplary process thus may evaluate the metrics independently and generally simultaneously, based on a given metric precedence. The process 200 may thus evaluate all of the available metrics generally at the same time, as opposed to relying first upon a most important factor or metric, and then only relying on the other metrics to break a "tie." The exemplary process 200 may thus provide for assigning weights to individual metrics for a specific desired priority of factors. In this example, let us assume that weights are given to positive metrics by 0.5 and 0.5 to bandwidth and SNR, respectively, such that these factors are valued generally equally. Additionally, the negative metrics listed in this example, link cost and latency, are scaled by factors of 0.8 and 0.2, respectively, thereby imposing a greater sensitivity of the handover determination to link cost than latency. Based on these given weights for the positive and negative factors, the profit function and cost function are shown in the sixth and seventh columns, respectively, of table 2 below. The HDI values are provided in the eighth column, by determining the ratio of the profit function to the cost function.

TABLE 2

HDI values for the links

| Link ID | Bandwidth (weight = 0.5) | SNR (0.5) | Link Cost (0.8) | Latency (0.2) | Profit factor | Cost factor | HDI Value |
|---|---|---|---|---|---|---|---|
| 1 | 0.4 | 0.85 | 0.21 | 0.7 | 0.625 | 0.308 | 2.029 |
| 2 | 0.54 | 0.75 | 0.35 | 0.85 | 0.649 | 0.44 | 1.475 |
| 3 | 0.98 | 0.65 | 0.49 | 0.55 | 0.815 | 0.667 | 1.222 |
| 4 | 0.8 | 0.78 | 0.99 | 0.59 | 0.79 | 0.9 | 0.877 |
| 5 | 1.10 | 0.54 | 0.85 | 0.99 | 0.82 | 0.878 | 0.934 |

The exemplary process 200 may thus select the link with the highest HDI value. From the numerical example in Table 2, above, the target link for the handover is link 1.

Thus, the exemplary process 200 may generally simultaneously use a plurality of metrics or factors to determine handovers of a mobile device 104, rather than relying on a single factor. Further, where the process 200 generally calculates the HDI simultaneously, this may allow a more flexible determination of handovers as compared with methods using a simple ordered preference of the available factors. Factors having a lower overall preference, for example, a factor that is less important than several other factors, may have a greater influence over handover decisions where the HDI is calculated generally simultaneously, as use of numerical scaling nonetheless allows these lesser factors to influence each handover decision. By comparison, use of a simple ordered preference of certain factors, especially where there are three or more factors, may result in lesser factors rarely or never being employed to influence a decision, as the lesser factors would only be employed where all other higher priority factors are not determinative.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A method, comprising:
    detecting an initiated communication between a mobile device and a first communication link;
    determining a value for each of a plurality of factors associated with each of a plurality of available communication links, the plurality of factors including a plurality of types of factors;
    assigning a desired communication link from the plurality of available communication links based upon a generally simultaneous assessment of the plurality of factors; and
    establishing selecting the desired communication link from the plurality of available communication links based upon at least a numerical comparison of each of the communication links, the numerical comparison including a comparison of a first one of the plurality of factors with a second one of the plurality of factors, the first one of the plurality of factors having a first one of the plurality of types, the second one of the plurality of factors having a second one of the plurality of types.

2. The method of claim 1, establishing selecting the desired communication link from the plurality of available communication links based upon the plurality of factors as determining a handover index for each of the available communication links, and establishing the handover index as the numerical comparison of each of the communication links.

3. The method of claim 1, establishing the numerical comparison as one of a ratio of one or more positive factors to one or more negative factors, and a ratio of the negative factors to the positive factors.

4. The method of claim 1, establishing the generally simultaneous assessment of the plurality of factors as a relative ranking of each of the communication links, the relative ranking indicating a likelihood of a handover to an associated link device.

5. The method of claim 1, further comprising:
    normalizing the plurality of factors to create a plurality of normalized factors;
    establishing the normalizing of the plurality of factors as scaling each of the plurality of factors between a minimum magnitude associated with each of the plurality of factors and a maximum magnitude associated with each of the plurality of factors; and
    establishing determining the desired communication link as determining the desired communication link based upon at least the plurality of normalized factors.

6. The method of claim 1, further comprising weighting each of the factors according to a predetermined relative importance of each of the factors.

7. The method of claim 1, further comprising determining the plurality of available communication links.

8. The method of claim 1, establishing the plurality of available communication links as having a predetermined link signal strength with the mobile device.

9. The method of claim 1, further comprising receiving signal transmission at the first communication link.

10. The method of claim 9, further comprising receiving the signal transmission at the desired communication link.

11. The method of claim 1, further comprising initiating a handover of the signal transmission from the first communication link to the desired communication link.

12. The method of claim 1, establishing the initiated communication as a phone call.

13. A communication system, comprising:
a handover server storing a heuristic for determining handovers for a mobile device;
wherein the handover server is configured to detect an initiated communication between the mobile device and a first communication link, the handover server further configured to determine a value for each of a plurality of factors associated with each of a plurality of available communication links, the plurality of factors including a plurality of types of factors, the handover server further configured to assign a desired communication link to the mobile device from the plurality of available communication using a simultaneous assessment of the plurality of factors, the handover server further configured to select the desired communication link from the plurality of available communication links based upon at least a generally simultaneous numerical comparison of the communication links, the numerical comparison including a comparison of a first one of the plurality of factors with a second one of the plurality of factors, the first one of the plurality of factors having a first one of the plurality of types, the second one of the plurality of factors having a second one of the plurality of types.

14. The communication system of claim 13, wherein the handover server is configured to select the desired communication link from the plurality of available communication links based upon a handover index for each of the available communication links, the handover index including the generally simultaneous numerical comparison of the communication links.

15. The communication system of claim 13, wherein the simultaneous assessment of the plurality of factors includes a relative ranking of each of the communication links, the relative ranking indicating a likelihood of a handover to an associated link device.

16. The communication system of claim 13, wherein the initiated communication is a phone call.

17. A system, comprising:
a handover server in communication with a communication network configured to support initiated communications from a mobile device;
wherein the handover server is configured to detect an initiated communication between the mobile device and a first communication link, the handover server further configured to determine a value for each of a plurality of factors associated with each of a plurality of available communication links, the plurality of factors including a plurality of types of factors, the handover server further configured to assign a desired communication link to the mobile device from the plurality of available communication using a simultaneous assessment of the plurality of factors, the handover server further configured to select the desired communication link from the plurality of available communication links based upon at least a generally simultaneous numerical comparison of the communication links, the numerical comparison including a comparison of a first one of the plurality of factors with a second one of the plurality of factors, the first one of the plurality of factors having a first one of the plurality of types, the second one of the plurality of factors having a second one of the plurality of types.

18. The system of claim 17, wherein the handover server is configured to select the desired communication link from the plurality of available communication links based upon a handover index for each of the available communication links, the handover index including the generally simultaneous numerical comparison of the communication links.

19. The system of claim 17, wherein the simultaneous assessment of the plurality of factors includes a relative ranking of each of the communication links, the relative ranking indicating a likelihood of a handover to an associated link device.

20. The system of claim 17, wherein the initiated communication is a phone call, and the primary data line is a primary phone number.

21. A method, comprising:
detecting an initiated communication between a mobile device and a first communication link;
determining a value for each of a plurality of factors associated with each of a plurality of available communication links;
assigning a desired communication link from the plurality of available communication links based upon a generally simultaneous assessment of the plurality of factors
normalizing the plurality of factors to create a plurality of normalized factors;
establishing the normalizing of the plurality of factors as scaling each of the plurality of factors between a minimum magnitude associated with each of the plurality of factors and a maximum magnitude associated with each of the plurality of factors; and
establishing determining the desired communication link as determining the desired communication link based upon at least the plurality of normalized factors.

* * * * *